United States Patent [19]
Nalle, Jr

[11] 3,756,300
[45] Sept. 4, 1973

[54] PLASTIC MESH BAG
[76] Inventor: George S. Nalle, Jr, 108 W. 2nd St., Austin, Tex. 78701
[22] Filed: Sept. 20, 1971
[21] Appl. No.: 181,718

[52] U.S. Cl.............. 150/1.7, 150/3, 229/DIG. 3, 264/292
[51] Int. Cl............................................. B65d 1/38
[58] Field of Search .................... 150/1, 1.7, 48, 50; 264/288, 292, DIG. 81

[56] References Cited
UNITED STATES PATENTS

| | | | |
|---|---|---|---|
| 3,184,524 | 5/1965 | Whiteford | 264/292 X |
| 3,642,967 | 2/1972 | Doll | 229/DIG. 3 |
| 3,313,470 | 4/1967 | Renner | 150/1.7 X |
| 3,470,928 | 10/1969 | Schwartz | 150/1 |
| 3,140,330 | 7/1964 | Gutierrez | 264/288 |
| 2,979,844 | 4/1961 | Lattuca | 150/48 |

FOREIGN PATENTS OR APPLICATIONS

| | | | |
|---|---|---|---|
| 1,223,027 | 2/1971 | Great Britain | 229/DIG. 3 |
| 350,767 | 1/1961 | Switzerland | 229/DIG. 3 |

*Primary Examiner*—Donald F. Norton
*Attorney*—Tom Arnold et al.

[57] ABSTRACT

A seamless plastic mesh bag is made from a melt of thermoplastic by forming an open mesh network of plastic strands terminating in a selvage of thickened cross-section and then stretching the mesh. The selvage forms the upper rim of the finished bag and may include integral handles and latching closures. The stretched open mesh forms the bag body. The stretching may include molecular orientation, and is accomplished by moving a mandrel against the mesh. Suitable apparatus produces bags in a desired variety of sizes and shapes.

17 Claims, 9 Drawing Figures

PATENTED SEP 4 1973 3,756,300
FIG. 1
FIG. 2
FIG. 3
FIG. 4
FIG. 5
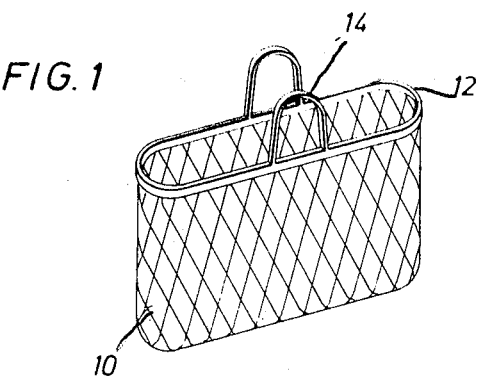
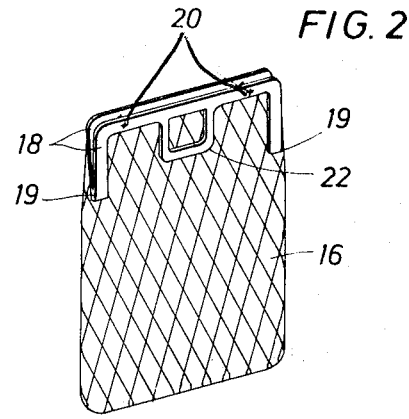
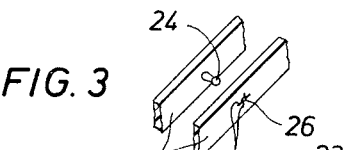
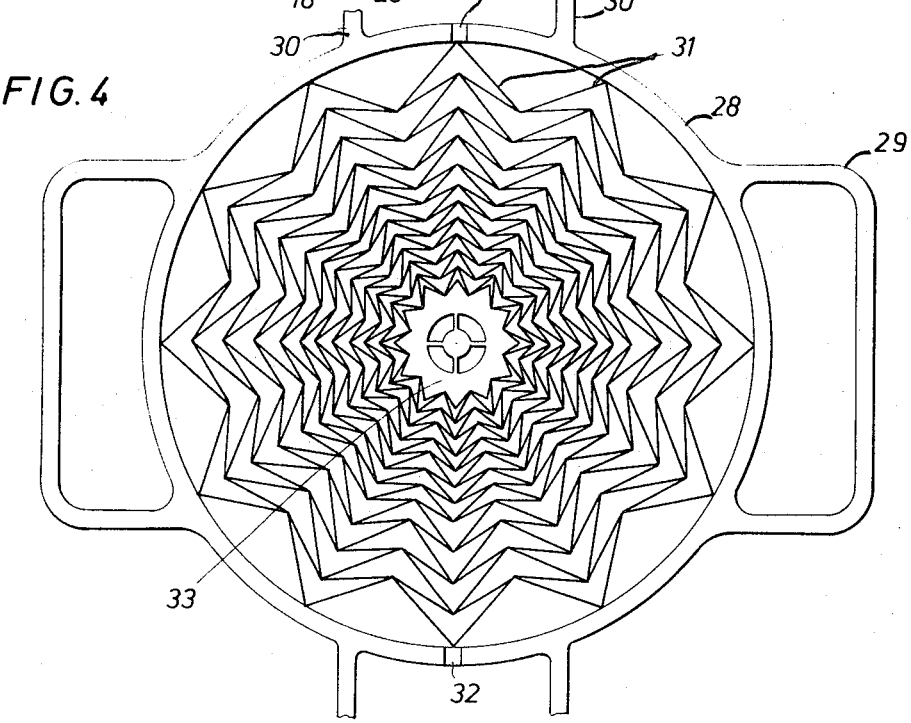
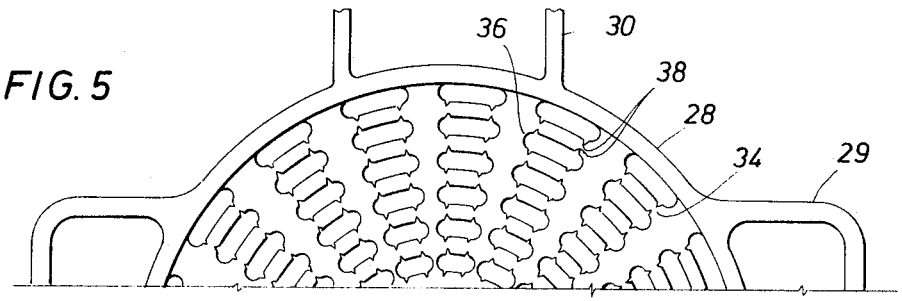

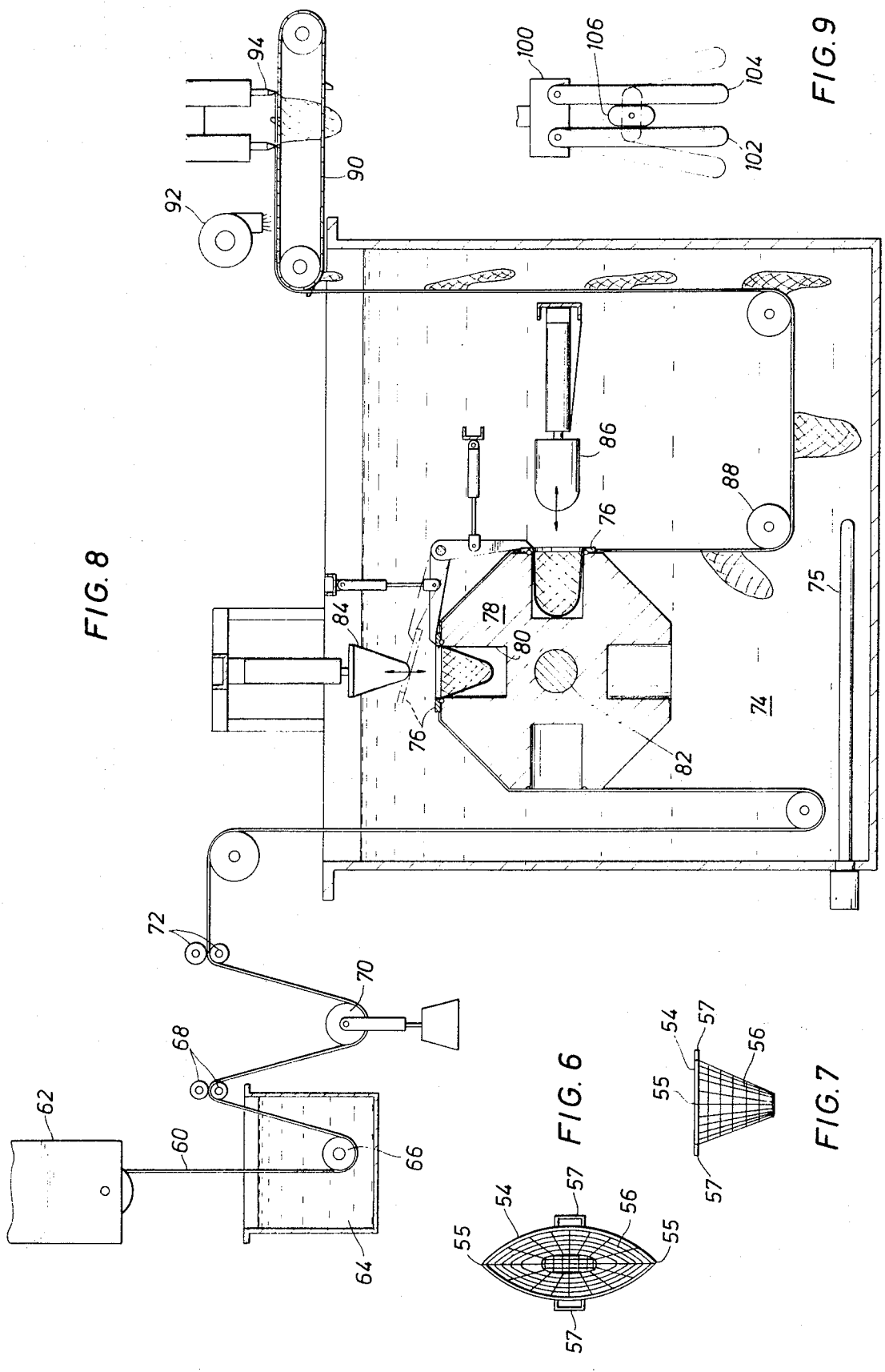

3,756,300

PLASTIC MESH BAG

BACKGROUND OF THE INVENTION

This invention relates to a novel plastic mesh bag and to methods and apparatus for producing the same. More particularly, this invention relates to a seamless, integrally formed plastic bag having an open mesh or net body, to methods for producing such bags from thermoplastic melts, and to apparatus useful in such production.

Mesh, as used herein, includes open-work, lace, net, and like products. A great variety of plastic mesh products, as well as methods and apparatus for their production, are well known in the art. Many of these products are widely used in packaging and decorative applications.

Bags commonly made from plastic mesh include, for example, those intended for the packaging of vegetables, fruit, and the like, which are commonly produced by stitching or otherwise closing the lower end of a segment of tubular mesh. Such bags are filled with their intended contents and similarly closed at their upper ends. This type of bag is not suitable for general use as a shopping bag or the like because it is not adapted to be lifted or carried by its upper end except by gathering the mesh and grasping it annularly, nor is it adapted for attaching handles to the mesh edges at their tops. The manufacture of mesh bags from flat sheets of mesh rather than tubular mesh additionally requires folding the mesh sheet and connecting the two edges of the sheet to each other in some manner, as by heat sealing, stapling, or the like.

SUMMARY OF THE INVENTION

The present invention relates generally to a new and improved plastic mesh bag suitable for use as a shopping bag and for carrying purchases from department stores, specialty shops, and the like, and to methods and apparatus for producing such bags from a melt of thermoplastic.

Plastic mesh bags according to this invention are of one-piece, integral, i.e., seamless, construction, and provide an inexpensive, convenient, and relatively transparent bag suitable for numerous applications wherein merchants desire to provide bags to customers for carrying their purchases while also wishing the contents of the bags to be visible as a deterrent to pilfering, shoplifting, and the like.

It is, therefore, one object of this invention to provide a plastic mesh bag suitable for carrying purchases from department stores, specialty shops, grocery stores, and the like.

It is a further object of this invention to provide a seamless bag of generally open plastic mesh which may be easily and conveniently carried by a shopper, and which permits the contents to remain visible to deter its use in connection with pilfering, shoplifting, and the like.

Another object of this invention is to provide a method for producing seamless, integrally formed plastic mesh bags from a melt of thermoplastic.

Among the other objects of this invention is to provide a continuous method for producing seamless plastic mesh bags.

Among the further objects of this invention is to provide apparatus for making the plastic mesh bag of this invention.

These objects and others which will be apparent are achieved by the present invention wherein a seamless open mesh plastic bag comprises a continuous open mesh network body having an integral selvage of greater cross-section forming an upper rim to support the bag. The mesh network preferably comprises a matrix of four-sided polygons having their short axes in the direction that stretching occurs to shape the bag bodies. Such bags are made from a melt of thermoplastic by first forming a plastic blank comprising an open mesh network of flexible strands having a thicker selvage, and then stretching the mesh in one or more steps to produce the bag body. The stretching of the mesh is best carried out under temperature-controlled conditions to obtain the desired degree of molecular orientation in the finished bags. Handles may be provided on the selvage to facilitate carrying of the bag. The drawing of the bag bodies is accomplished by moving a mandrel of suitable size and shape against the open mesh network while holding the selvage securely in place.

BRIEF DESCRIPTION OF THE DRAWINGS

FIG. 1 is a perspective view of one embodiment of the plastic mesh bag of this invention.

FIG. 2 is a perspective view of an alternate embodiment of the plastic mesh bag of this invention.

FIG. 3 is a partial perspective view of the bag illustrated in FIG. 2, showing a pin-and-socket latching assembly.

FIGS. 4 and 5 are partial top views of series of interconnected flat plastic blanks for producing bags of this invention, illustrating various alternate embodiments of open mesh network.

FIG. 6 is a top view of an injection molded blank for making mesh bags in accordance with this invention.

FIG. 7 is a side view of the injection molded blank of FIG. 6.

FIG. 8 schematically illustrates one embodiment of the method and apparatus for making seamless plastic mesh bags in accordance with this invention.

FIG. 9 is a plan view of an alternate mandrel for drawing plastic mesh to form bodies of bags in accordance with this invention.

DESCRIPTION OF PREFERRED EMBODIMENTS

Referring now to FIG. 1, reference numeral 10 identifies a seamless plastic mesh bag defining a selvage edge 12 including handles 14. As shown, handles 14 are in mating, abutting relationship for carrying the bag. This one-piece, integral structure results in a lightweight, high strength, tear-resistant bag, which may be relatively inexpensively manufactured. It will be apparent that the size and shape of the bag, as well as of the strands forming the open mesh body, may be varied to suit the end use for which the bag is intended. For example, bags intended for use as shopping bags would be larger and of heavier construction than those intended for carrying small purchases. Also, the transverse cross section of the mesh strands may be circular, oval, triangular, rectangular, or the like. For example, rectangular cross-section strands may resemble ribbons in some cases.

The term "seamless" as used herein to describe the plastic mesh bag of this invention means that no welds are made in any part of the bag after the original bag blank is formed, as will be described below, and that no staples or other connecting means are added to the blank after such forming. In other words, the entire bag is formed from a single piece of plastic.

The integral structure of the mesh and selvage portions of the bag results in a strong and lightweight unit having exceptional strength with respect to the amount of plastic used. The handles formed in the selvage at the top of the bag enable the bag to be easily picked up, shaken open, filled, and carried. Although this bag might be quite acceptable without handles, as the selvage might be folded upon itself and grasped much as a handle would be, perhaps with the carrier's fingers extending through the mesh openings of the bag, the provision of handles results in more convenient carrying and is preferred.

FIG. 2 illustrates an alternative embodiment of the plastic mesh bag of this invention. In this embodiment, mesh 16 terminates in integral selvage 18, and handles 22 are integral with mesh 16 as well as with selvage 18. It will be noted that the selvages of the bags illustrated in FIGS. 1 and 2 form closed figures which may be disposed in a plane. When the selvage is so disposed, handles 14 of FIG. 1 will be outside the closed figure defined by selvage 12, whereas handles 22 of FIG. 2 will be inside the closed figure defined by selvage 18.

Selvage 18 also contains a pair of hinges 19 about which the selvage is folded. These hinges are of standard configuration and are formed by notching or otherwise reducing the cross section of the selvage at appropriate locations. Durability of such hinges is particularly good when the material of which they are formed is polypropylene. Of course, hinges are not necessary to the bags of this invention, as may readily be appreciated by their absence from the embodiment of FIG. 1.

In this embodiment, selvage 18 further defines typical pin-and-socket latching assemblies 20, as are known in the art. One such assembly is illustrated in greater detail in FIG. 3. Each pin-and-socket latching assembly consists of a pin 24 having a head slightly larger than the diameter of the shank between the head and the selvage, and a socket, or hole, 26 having a diameter slightly smaller than the head of pin 24. The pins and sockets are correspondingly located so that when the selvage is folded about the hinges between them they will be in mating relationship, permitting the pins to be pushed through sockets. The pins will be retained in the sockets because the heads are slightly larger than the diameter of the sockets. Sockets 26 may be cross cut at spaced locations around their periphery as indicated by cuts 28 to make it easier for the head of pin 24 to be pushed through the socket. By changing the relative sizes of the pins and sockets, pin-and-socket latching assemblies permitting repeated reopening of the bag may be converted to locking assemblies in which opening of the bag will likely destroy the pins by pulling the heads from the shanks. Of course, other latching assemblies may be used with the bags of this invention. For example, a hook-and-loop latching assembly such as "Velcro" or a plastic "zipper" might be used.

FIGS. 4 and 5 illustrate alternative embodiments from which plastic mesh bags in accordance with this invention may be formed. The flat plastic blank of FIG. 4 includes an open mesh network 31 terminating in selvage 28. Handles 29 are integral with selvage 28. In addition, interconnections 30 serve to connect successive extruded blanks in a continuous series, or stream. These interconnections are formed only for convenience in handling the series of continuously extruded blanks, and are removed during the final processing of the bags. The solid plastic region 33 of mesh 31 is provided to give extra strength to the bag bottom, and to provide a location for applying tension forces to the mesh to stretch the mesh into a bag shaped body. Hinges 32 are formed in the selvage to permit easy folding of the selvage to bring the handles into abutting relation.

FIG. 5 illustrates still another embodiment of the open mesh network of the bags of this invention, wherein web 34 defines numerous variably sized openings 36 having their long dimensions generally in the direction defined by the selvage and their short dimensions generally perpendicular to the selvage. Additionally, web 34 defines notches 38 reducing the cross section of plastic in the mesh at selected locations as an aid to achieving a controlled molecular orientation upon drawing the mesh to form the body portion of the bag.

It will be appreciated that a variety of plastic materials are suitable for application in the plastic mesh bags of this invention, including polyethylene, polypropylene, other polyolefins, polyamides, polyesters, and like thermoplastic materials, the nature and properties of which are well known to those skilled in the art.

A wide variety of mesh patterns may be applied in various embodiments of this invention. In particular, for any given blank size and material, longer strands within the mesh between strand intersections will permit a deeper drawing to be done in forming the bag body. Such strands may follow a sine wave path in a generally square pattern, the wavy path providing more plastic between strand intersections than is provided in a similar straight strand pattern. Additional alternatives would include zig-zag strands and strands in a spiral pattern. As stretching of the mesh to form the bag bodies will occur to the greatest extent in the direction between the selvage and the center of the mesh network, a network of strands forming polygons having at least four sides with their short axes in the direction of stretch will be well suited to this invention. It will be appreciated that a mesh network of triangles or other stable figures will be less desirable in this application, although any mesh network pattern may be used if the amount of stretching is limited accordingly.

FIGS. 6 and 7 illustrate a three-dimensional, injection molded blank for making seamless plastic mesh bags in accordance with this invention. Such blanks may be produced with injection molding apparatus and techniques well known to those skilled in the art. The advantage of injection molding is that a three-dimensional blank may be produced, requiring less stretching than would a flat blank to form a suitable mesh bag. The advantage of forming a three-dimensional blank will, of course, be related to the depth of the mesh portions so formed. In this embodiment, open mesh 56 terminates in selvage 55 which defines two symmetrical arcuate sections intersecting in acute angles 55. The selvage may be folded along the axis defined by intersections 55 so that handles 57, integral with the selvage, are in mating alignment. The plastic mesh of this blank is formed with a flat bottom, as is best illustrated in FIG. 7.

Injection molded blanks for the open mesh plastic bags of this invention may be formed in a variety of sizes and shapes. Although such blanks are three-dimensional, and may be useful as mesh bags immediately upon such forming, these blanks will usually be drawn to form deeper bags to more efficiently use the plastic therein. Of course, plastic blanks for the production of bags in accordance with this invention may be made by die cutting a sheet of plastic or by a combination of methods such as first injection molding and then die cutting the blanks.

It will be seen that the selvages of the seamless plastic bags of this invention may be of almost any shape. For example, in FIG. 1 the selvage has two generally parallel sides joined at their ends by arcuate sections. The selvage of FIG. 2, when disposed in a plane, is rectangular and includes hinges; that of FIGS. 4 and 5 is circular. In fact, any closed figure will be satisfactory for the selvage of the bags of this invention. If a pair of handles is to be provided on the selvage, they are most satisfactorily located in opposing relationship so that when the selvage is folded about its hinges or otherwise brought together the handles will be in abutting relationship to be grasped easily with one hand.

The seamless plastic mesh bag of this invention may be produced by forming a melt of thermoplastic into an integral structure comprising an open mesh of thermoplastic strands surrounded by a relatively heavier rim, or selvage, and then drawing the mesh portion of that structure to form the body portion of the bag. The initial forming of the mesh-selvage structure may be accomplished by extrusion of a substantially flat, or two-dimensional, blank using cylindrical extrusion means substantially as described in my U.S. Pat. No. 3,394,431. It will be understood that the two- or three-dimensional blank also might be produced by injection molding using apparatus and techniques commonly known to those skilled in that process.

One embodiment of the method for producing seamless, plastic mesh bags in accordance with this invention is schematically illustrated in FIG. 8. Production commences with the forming of a series or stream 60 of interconnected plastic blanks from rotating cylindrical extrusion means 62. The series of plastic blanks is then passed into cooling bath 64, where the plastic is given an initial set. Roller 66 may conveniently be located in the bath to turn the stream of blanks. Drive rollers 68 counterrotate to move the stream of plastic blanks between them at a constant rate substantially equal to that at which the blanks are extruded. Drive rollers 72 counter-rotate to move the stream of plastic blanks between them in intermittent, or step-wise, fashion to feed the stream of blanks to the drawing operation which will be described below. Slack loop 70 is formed between rollers 68 and rollers 72 to maintain a relatively constant tension on the continuous stream of blanks between their continuous extrusion and their stepped advancement through the drawing operation. The slack loop typically includes a weighted roller which alternately falls and rises as the amount of material between the extrusion and drawing operations varies.

The stream of plastic blanks is then advanced into temperature controlled bath 74 to bring the temperature of the plastic to that desired for the drawing operation. When it is desired to molecularly orient the plastic strands of the open mesh, the temperature of bath 74 will typically be maintained below the melting point and above the glass transition point of the plastic. This temperature range is a function of the particular plastic of which the open mesh bags of this invention are formed. The amount of molecular orientation obtained in the drawing process will be affected by the temperature of the bath. A bath temperature approximately half-way between the melting point and the glass transition point of the plastic is usually suitable for achieving molecular orientation. Too high a temperature will have an adverse effect on the orientation because of the annealing or molecular relaxation which occurs at temperatures in the upper portion of this range. It will be appreciated, of course, that many other factors affect the degree of molecular orientation which will occur on the processing of plastic materials, and that the melting point and glass transition point of a given plastic define only the temperature limits between which molecular orientation may be achieved. In many plastics this temperature range spans normal room temperature, while in others the glass transition temperature may be 100°C. or more. The temperature of the bath may be controlled by heater 75, or by suitable cooling means (not shown) as required by the thermoplastic material.

The drawing operation may be carried out in one or more steps as illustrated by FIG. 8. The plastic mesh blank is moved into position within the bath over a rotatable support member 78. A selvage hold-down member 76 is moved against the support member, grasping the selvage of the bag blank between the hold-down member and the support member. Support member 78 is rotatably mounted on axle 82, and defines in this embodiment four pockets 80 into which the mesh may be stretched by the drawing apparatus.

After the selvage is secured to the support member by the hold-down member, a first mandrel 84 is advanced into pocket 80 to stretch the mesh. Mandrel 84 is then withdrawn, hold-down 76 raised, and support member 78 rotated clockwise 90° to a second drawing station. At the second drawing station, a second hold-down 76 is moved into position against the support member to hold the selvage firmly in place while a second mandrel 86 is moved into pocket 80 to further stretch and give final form to the mesh bag. Mandrel 86 is then withdrawn, hold-down member 76 raised, and support member 78 again rotated 90° clockwise. During this rotation, the plastic mesh body of the bag is withdrawn from pocket 80, and advanced out of the bath. Roller 88 may be placed in the bath to assist in drawing the bag from the support member and turning the stream of bags for removal from the bath.

The stream of plastic mesh bags is advanced from the bath by suitable means such as a pair of chain-type drive members 90, engaging the selvage on either side of the plastic mesh bags. Where desired, a blower 92 may be used to blow air over the finished bags to cool the plastic as the stream emerges from the temperature controlled bath. A cutter 94 then trims the excess plastic which formed the interconnecting means between the individual bags in the stream of blanks, and the bags are ready for packing and shipment. The excess plastic may be collected and recycled to extruder 62.

It will be understood that the drawing of the plastic mesh bags of this invention may be carried out in a single drawing operation rather than in the two-stage drawing operation described above. In such a case, the bag would be withdrawn from support member 78 and removed from bath 74 after drawing has been accomplished at the first drawing station. Although the drawing operation may utilize both male and female drawing members in shaping the plastic bags of this invention, the drawing may be accomplished by use of a suitable male member together with means for holding the selvage securely in place while the mesh is stretched.

When two-stage drawing is to be carried out, the plastic interconnections between the individual bag blanks must be of a sufficient length to span the circumference of member 78 between two adjacent pockets. If a single drawing operation is to be performed on the blank, the length of the interconnections may be reduced accordingly. Support member 78 may be rotated in any ordinary motive means, appropriately geared to the advancement of the plastic mesh bag blanks. The number and location of pockets around the periphery of support member 78 may be varied as desired, depending on the size of pocket desired and the size of support member 78. In the two-stage drawing operation illustrated, the drawing stations are located 90° apart. Simultaneous drawing may be carried out at the two stations. It will be appreciated that the drawing operation might be carried out in three or more stages, as well as that the two-stage drawing operation might preferably be carried out with the mandrels in opposing relation to one another to more evenly balance the loading on axle 82 of the support member.

FIG. 9 illustrates another embodiment of the mandrels of FIG. 8. In this embodiment, expandable mandrel 100 comprises two individual mandrel elements 102 and 104 separated by cam 106. In operation, mandrel 100 is advanced against the mesh through the selvage and into a pocket of the support member with the long axis of the cam in the direction of movement of the mandrel. After the mandrel has been advanced into the pocket, cam 106 is rotated 90° to expand the outer ends of mandrel elements 102 and 104 to increase the transverse dimension of the plastic mesh bag body, generally at the end of the bag body away from the selvage. Cam 106 is returned to its original position and mandrel 100 withdrawn from the pocket. Use of such an expandable mandrel is desirable in producing a generally flat bottomed bag in a single drawing stage. Alternate expandable mandrels will include mandrels formed of an expandable material such as rubber or the like and adapted to stretch the mesh in a first direction along the long axis of the mandrel and then to be inflated to stretch the mesh transversely to that first direction. It will be appreciated that other embodiments of multiple element mandrels may also be applied to produce plastic mesh bags of this invention. For example, a three-element mandrel might be used in which the central element is initially advanced to stretch the plastic and the two outer elements are subsequently advanced to produce an additional stretch giving the bag body its finished shape.

As above discussed, the production of plastic mesh bags in accordance with this invention may utilize molecular orientation of the mesh strands to produce relatively stronger bags using less plastic. By molecularly orienting the mesh strands, a stretch of 4 to 1, more or less, may be achieved in the mesh while increasing the tensile strength of the mesh in the stretched direction. As deeper bags, requiring a greater draw, are desired, it becomes advantageous to lengthen the paths of the mesh strands in the bag blanks to provide sufficient plastic for the deeper draw, as above discussed. Improved molecular orientation of the mesh may be achieved by carefully controlling the uniformity of temperature in the mesh and the uniformity of tension applied to the mesh during the drawing operations.

The mesh portion of the bag blank may be structured to improve orientability by the inclusion therein of notches as illustrated by FIG. 5, to reduce the cross section of the plastic in the mesh at such locations so that stretching and orientation will tend to start there, or by selectively varying the cross section of the mesh strands. For example, mesh 31 of FIG. 4 might be dimensioned so that the diameter of the mesh strands increases slightly from the center outwardly towards the selvage or, conversely, from the selvage in towards the center such that orientation of the mesh will tend to initiate uniformly in annular rings as tension is applied to the mesh. Orientation of such a mesh will tend to occur in the annular region defined by the weakest mesh segments, and will propagate through increasingly larger segments until the entire mesh is oriented. It will be understood by those skilled in the art that the choice of relative mesh dimensions must be made over a restricted range, in that the resistance to further stretching of the oriented portions of the mesh must be greater than that of the remaining unoriented portions in order to avoid weakening or breaking the mesh strands. Orientation, of course, need not occur over the entire length of any individual strand in the mesh. The orientation may initiate in a given strand and propagate through less than the entire segment of the strand between mesh intersections. Similarly, orientation may occur in some strands and not in others. These effects will be determined by the degree of stretch to which the mesh is subjected, and by the relative geometries of the mesh pattern and the mandrel by which it is stretched.

Numerous variations of the plastic mesh bag embodiments illustrated herein will be apparent to those skilled in the art. For example, the relative sizes and patterns in which the mesh strands are formed in the bag blanks will affect to a large extent the size and shape of bag which may ultimately be produced. In addition, the size and shape of the selvage of the plastic mesh may be varied to achieve desired bag shapes, including circular, rectangular elliptical, and the like. Accordingly, the embodiments disclosed herein are illustrative only, and may be readily modified by those ordinarily skilled in the art without departing from the spirit and scope of this invention. Therefore, it is not intended that the above embodiments circumscribe the invention except as it is limited by the appended claims.

What is claimed is:

1. A blank deformable to constitute a seamless plastic mesh bag, comprising:
    a substantially two-dimensional, seamless open mesh network of flexible thermoplastic strands,
    said network having a single selvage edge defining a closed figure,
    said selvage being of relatively greater cross section than the strands of said network, and
    said strands being deformable with respect to said selvage when said selvage is disposed in a plane to define an open mesh surface bounded by said selvage and having a significant dimension in a direction normal to said plane.

2. A blank deformable to constitute a seamless plastic mesh bag as recited in claim 1, wherein some of the strands of said network are adapted to be at least partially molecularly oriented in the direction normal to said plane.

3. A blank deformable to constitute a seamless plastic mesh bag as recited in claim 1 and having a handle disposed on said selvage.

4. A blank deformable to constitute a seamless plastic mesh bag as recited in claim 1, including handle means disposed in opposing relation on said selvage.

5. A blank deformable to constitute a seamless plastic mesh bag as recited in claim 1, including hinge means formed into said selvage at opposed points thereon permitting opposing halves of said selvage to be folded into abutting relationship.

6. A blank deformable to constitute a seamless plastic mesh bag as recited in claim 5, including means to hold said opposing halves of said selvage in abutting relationship for maintaining said bag in a closed condition.

7. A blank deformable to constitute a seamless plastic mesh bag as recited in claim 1, wherein the closed figure defined by said selvage approximates a circle.

8. A blank deformable to constitute a seamless plastic mesh bag as recited in claim 1, wherein the closed figure defined by said selvage approximates a rectangle.

9. A blank deformable to constitute a seamless plastic mesh bag as recited in claim 1, wherein said network comprises a matrix of four-sided polygons.

10. A blank deformable to constitute a seamless plastic mesh bag as recited in claim 9, wherein each of said polygons has a short axis generally disposed toward the center of said network and a long axis generally parallel said selvage.

11. A blank deformable to constitute a seamless plastic mesh bag as recited in claim 10, wherein the closed figure defined by said selvage approximates a circle having opposing handle members outwardly disposed thereon.

12. A blank deformable to constitute a seamless plastic mesh bag as recited in claim 11, wherein the thickness of said selvage is greater than the thickness of the strands of said network.

13. A blank deformable to constitute a seamless plastic mesh bag as recited in claim 9, including hinge means disposed in said selvage.

14. A blank deformable to constitute a seamless plastic mesh bag as recited in claim 1, wherein said network comprises a matrix of mesh openings, each of said mesh openings having a long dimension generally in the direction defined by said selvage and a short dimension generally in the direction perpendicular to said selvage.

15. A blank deformable to constitute a seamless plastic mesh bag as recited in claim 14, including notches at selected locations in said mesh to reduce the cross section of the mesh at said locations.

16. A blank deformable to constitute a seamless plastic mesh bag as recited in claim 14, wherein the thickness of said selvage is greater than the thickness of the strands of said network.

17. A blank deformable to constitute a seamless plastic mesh bag as recited in claim 1, wherein said network comprises a matrix of mesh openings, each of said mesh openings having a long dimension generally in the direction defined by said selvage and a short dimension generally in the direction perpendicular to said selvage, including hinge means disposed in said selvage.

* * * * *